United States Patent Office 3,429,103
Patented Feb. 25, 1969

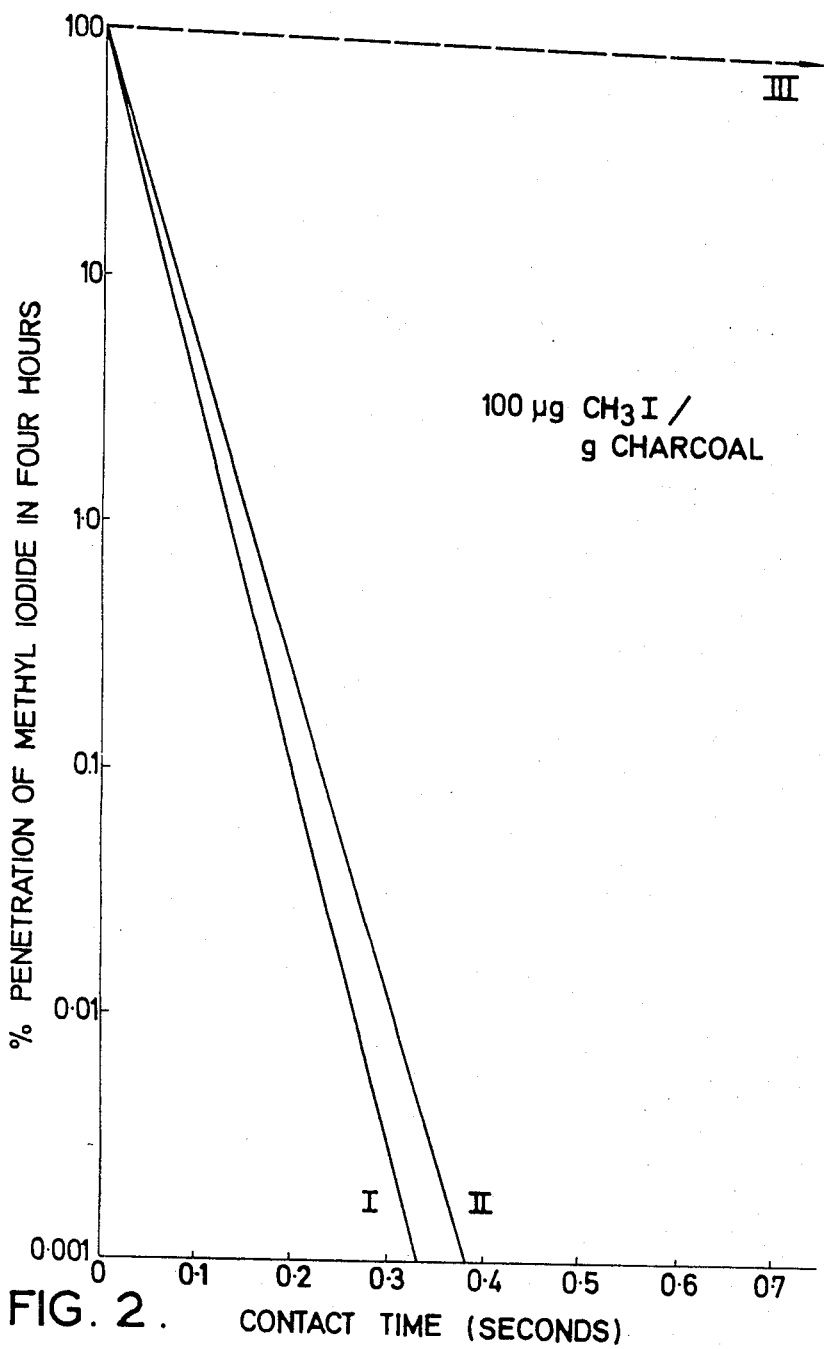

3,429,103
CHARCOAL FOR USE IN TRAPPING SYSTEMS
Roland Taylor, Egremont, Cumberland, England, assignor to United Kingdom Atomic Energy Authority, London, England
Filed July 27, 1966, Ser. No. 568,161
Claims priority, application Great Britain, July 28, 1965, 32,382/65
U.S. Cl. 55—71  2 Claims
Int. Cl. B01d 53/04, 53/16

ABSTRACT OF THE DISCLOSURE

Activated charcoal is provided by impregnating charcoal with an iodide of hydrogen, iron, nickel, alkali metals or alkaline earth metals. Trapping systems utilizing the activated charcoal are particularly effective for removing methyl iodide which is produced during the release of fission products from irradiated fissile material.

---

Figure 1:
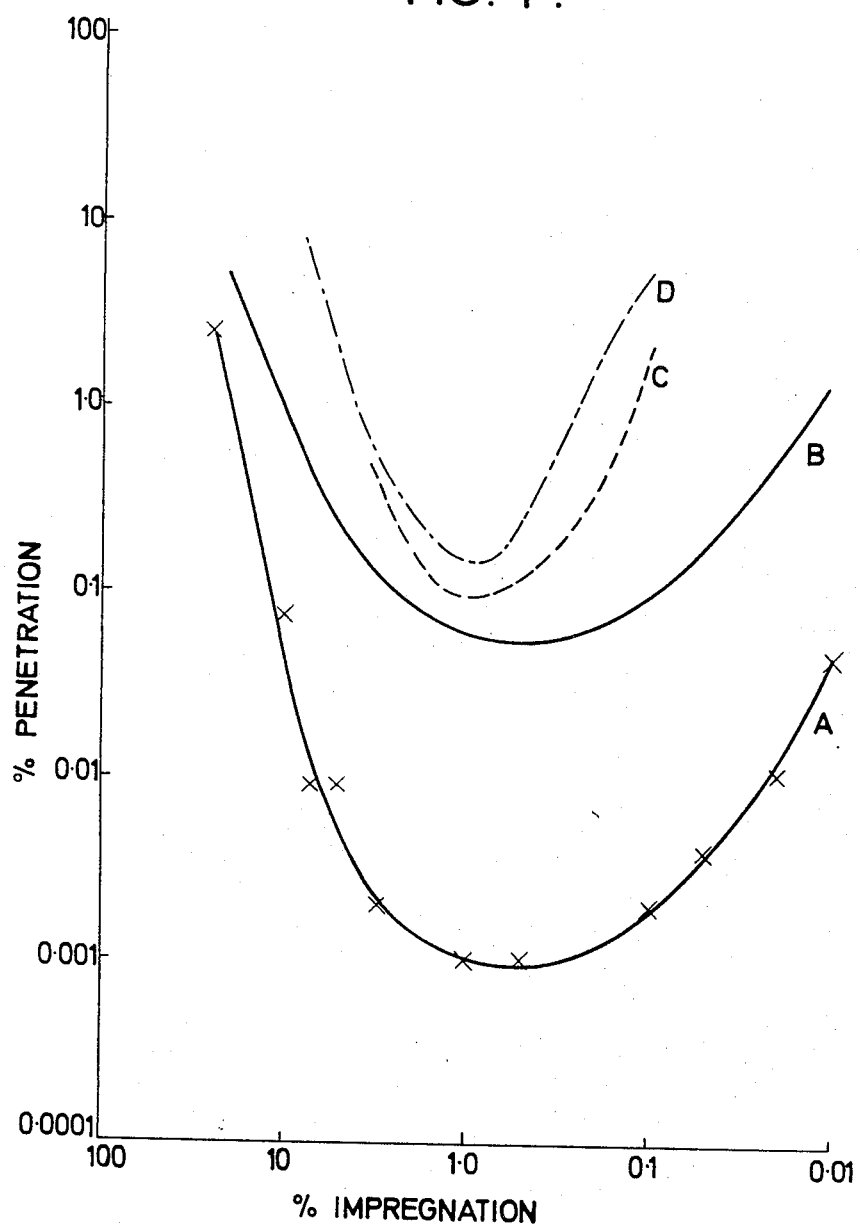

This invention relates to the use of impregnated charcoal in trapping systems, particularly fission product trapping systems in nuclear reactor installations.

When fission product iodine—which is one of the most important fission products to retain in a trapping system because of the immediate health hazard it presents—is released from irradiated uranium dioxide into carbon dioxide or steam some of the iodine is found in the form of methyl iodide. Methyl iodide is relatively unreactive compared with elemental iodine and will penetrate many of the trapping materials that can be used for elemental iodine but it can be held on activated charcoal if the conditions are right. Thus methyl iodide can be removed from dry air or carbon dioxide in the range from room temperature to 100° C. without difficulty by a coal-based charcoal provided that a certain loading of methyl iodide on the charcoal is not exceeded. Retention of methyl iodide on activated charcoal is seriously affected by high humidity, however, and although performance can be restored by preheating the gas stream passing through the charcoal this is not a particularly attractive solution.

The present invention is based on the discovery that activated charcoal impregnated with certain inorganic iodides is effective in retaining methyl iodide which is produced during the release of fission products from irradiated fissile material and that it may be used under conditions of high relative humidity and in a carbon dioxide atmosphere.

The present invention utilizes activated charcoal impregnated with an iodide of hydrogen, an alkali metal, an alkaline earth metal or the transition metals iron and nickel.

Preferred impregnants are potassium iodide which combines the advantages of relative low cost and effectiveness, and potassium tri-iodide.

The invention also utilizes a fission product trapping system for a nuclear installation, the system including activated charcoal impregnated with an iodide of hydrogen, an alkali metal, an alkaline earth metal or the transition metals iron and nickel.

The invention further consists in a method of extracting methyl iodide from a gas stream, said method comprising passing the gas stream through activated charcoal impregnated with an iodide of hydrogen, an alkali metal, an alkaline earth metal or the transition metals iron and nickel.

The charcoal may be impregnated with the iodide by soaking the charcoal in a solution of the iodide in water and allowing the water to evaporate off, the amount of impregnant thus being directly dependent on the concentration of iodide in the original aqueous solution of impregnant. Alternatively, an aqueous solution of the impregnant may be sprayed on to the charcoal.

The following examples illustrates the invention:

Gas carrying methyl iodide labelled with iodine 131 was passed through a demister and an absolute filter and then through a bed of impregnated charcoal 6 inches in depth and 1 inch in diameter. The carrier gas was air or carbon dioxide or a mixture of air and carbon dioxide. Its relative humidity was measured at the operating temperature of the charcoal bed. The amount of methyl iodide which penetrated the absorbent bed was indicated by comparing samples of gas from upstream and downstream of the absorbent bed and this was checked by the amount of methyl iodide remaining on the bed at the end of the experiment. In all experiments the charcoal beds were pre-equilibrated with the carrier gas at the appropriate relative humidity for 16 hours (that is, until the outgoing gas from the bed had the same relative humidity as the inlet gas). The bed was loaded with methyl iodide over a period of ten minutes and was then eluted with the appropriate gas for at least four hours. The loading was 100 $\mu$g. iodide per gram of charcoal.

Results are shown in the following Table I:

TABLE I

| Impregnant | | Carrier Gas | Relative Humidity (percent) | Face Velocity (ft./min.) | Contact Time (sec.) | Penetration in 4 hours (percent) |
|---|---|---|---|---|---|---|
| Type | W/O | | | | | |
| KI | 5.0 | Air | 100 | 300 | 0.10 | 2.0 |
| KI | 5.0 | Air | 100 | 120 | 0.25 | 0.009 |
| KI | 5.0 | Air | 100 | 60 | 0.50 | <0.001 |
| KI | 5.0 | Air | 100 | 40 | 0.75 | <0.001 |
| KI | 5.0 | Air | 100 | 30 | 1.00 | <0.001 |
| KI | 5.0 | Air | <2.0 | 60 | 0.50 | <0.001 |
| KI | 5.0 | Air | 20 | 60 | 0.50 | <0.001 |
| KI | 5.0 | Air | 50 | 60 | 0.50 | <0.001 |
| KI | 5.0 | Air | 80 | 60 | 0.50 | <0.001 |
| KI | 5.0 | Air | 100 | 60 | 0.50 | <0.001 |
| KI | 5.0 | $CO_2$ | 100 | 300 | 0.10 | 5.4 |
| KI | 5.0 | $CO_2$ | 100 | 120 | 0.25 | 0.18 |
| KI | 5.0 | $CO_2$ | 100 | 60 | 0.50 | 0.022 |
| KI | 5.0 | $CO_2$ | 100 | 40 | 0.75 | <0.001 |
| KI | 5.0 | $CO_2$ | 100 | 30 | 1.00 | <0.001 |
| KI | [1] 5.0 | Air | 100 | 120 | 0.25 | [1] 0.008 |
| KI | 0.5 | Air | 100 | 300 | 0.10 | 1.84 |
| CsI | 0.5 | Air | 100 | 300 | 0.10 | 3.2 |
| CsI | 2.0 | Air | 100 | 300 | 0.10 | 1.38 |
| RbI | 1.0 | Air | 100 | 300 | 0.10 | 1.0 |
| $NH_4I$ | 2.0 | Air | 100 | 300 | 0.10 | 1.22 |
| $CAI_2$ | 2.0 | Air | 100 | 300 | 0.10 | 0.83 |
| $FeI_2$ | 2.0 | Air | 100 | 300 | 0.10 | 10.3 |
| $NiI_2$ | 2.0 | Air | 100 | 300 | 0.10 | 0.52 |
| $NgI_2$ | 2.0 | Air | 100 | 300 | 0.10 | 0.37 |
| NaI | 2.0 | Air | 100 | 120 | 0.25 | 0.02 |
| HI | 5.0 | Air | 100 | 60 | 0.50 | 0.007 |
| HI | 5.0 | Air | 100 | 30 | 1.00 | <0.001 |
| HI | 0.5 | Air | 100 | 150 | 0.20 | 0.25 |
| $KI_3$ | 0.5 | Air | 100 | 150 | 0.20 | 0.12 |
| KI | 0.5 | Air | 100 | 300 | 0.10 | 3.3 |
| $I_2$ | 10 | | | | | |

[1] After aging by passing $10^6$ bed volumes of air at 50% RH through the charcoal.

Penetration by methyl iodide is dependent on the amount of impregnant. This is shown more clearly in the accompanying graph FIGURE 1, in which percent penetration is plotted against impregnant. The conditions were as follows:

Loading: 100 μg. $CH_3I$/g. charcoal
Carrier gas: Air 100% R.H.

The impregnants are:

Curve A—Potassium iodide. Contact time 0.25 sec.
Curve B—Potassium iodide. Contact time 0.20 sec.
Curve C—Potassium triiodide. Contact time 0.20 sec.
Curve D—Hydrogen iodide. Contact time 0.20 sec.

Curves A and B also indicate the effect of variation in contact time. This effect is shown more clearly in the graph of FIGURE 2 in which percent penetration is plotted against contact time. In this graph curve I is for 0.5% potassium iodide in air, curve II is for 0.5% potassium iodide in carbon dioxide, and curve III is for unimpregnated charcoal in either air or carbon dioxide.

In all cases the greater part of the methyl iodide penetration has been found to occur during the first hour after loading, the penetration of methyl iodide during the fourth and subsequent hours being at the limit of detection of the apparatus (0.0003%). Penetration does, however depend on the contact time between charcoal and gas (that is, the ratio of volume of gas to flow rate through the charcoal) as shown in FIGURE 2, and also on the methyl iodide load on the charcoal. Experiments performed with potassium performed with potassium iodide as impregnant showed that some penetration occurred after four hours if the load exceeded 100 μg. $CH_3I$/g. charcoal and that the penetration was dependent on the percentage of impregnant used, lower percentages being less effective in inhibiting penetration.

It has also been shown that potassium iodide-impregnated charcoal retains elemental iodine. Under the same conditions as in the previous experiments activated charcoal impregnated with 5% KI was loaded with 100 μg. elemental iodine and then eluted with air at 100% relative humidity and a face velocity of 200 feet/min. (contact time 1.5 secs.). Penetration in four hours was less than 0.001%.

The short contact times required with these impregnated charcoals relieve problems of pressure drops, the size of charcoal bed required, and the control of flow rates below critical values.

I claim:

1. A method of extracting methyl iodide from a gas stream, said method comprising passing a gas stream through a bed of activated charcoal comprising charcoal impregnated with an iodide of a material selected from the group consisting of alkali metals, alkaline earth metals, iron, nickel, and hydrogen, to extract methyl iodide from said gas stream.

2. A method according to claim 1 wherein said iodide is selected from the group consisting of potassium iodide and potassium tri-iodide.

References Cited

UNITED STATES PATENTS

| | | | |
|---|---|---|---|
| 2,003,277 | 5/1935 | Olsen | 252—444 |
| 2,835,343 | 5/1958 | Wolff et al. | 55—74 |
| 3,216,905 | 11/1965 | Baptist | 55—74 |
| 3,217,471 | 11/1965 | Silverman | 55—387 |
| 3,240,555 | 3/1966 | Nash | 55—74 |
| 3,318,662 | 5/1967 | Pauling | 23—168 |
| 3,329,626 | 7/1967 | Teter et al. | 252—425 |

REUBEN FRIEDMAN, *Primary Examiner.*

C. N. HART, *Assistant Examiner.*

U.S. Cl. X.R.

23—2.1; 55—74